United States Patent [19]

Selbert

[11] Patent Number: 4,789,201
[45] Date of Patent: Dec. 6, 1988

[54] SEAT TRIM ATTACHMENT STRIP

[75] Inventor: Alan J. Selbert, Tecumseh, Mich.

[73] Assignee: Hoover Universal, Inc., Ann Arbor, Mich.

[21] Appl. No.: 94,284

[22] Filed: Sep. 8, 1987

[51] Int. Cl.[4] .............................................. A47C 27/00
[52] U.S. Cl. .................................... 292/218; 297/452
[58] Field of Search ......................... 24/625, 694, 695; 160/398, DIG. 15, 391, 395, 387; 297/218, 452, 219

[56] References Cited

U.S. PATENT DOCUMENTS

| 1,947,130 | 2/1934 | Johnson | 24/625 |
| 2,817,392 | 12/1957 | Thomas | 160/398 |
| 3,120,971 | 2/1964 | Bengtsson | 24/625 X |
| 3,981,534 | 9/1976 | Wilton | 297/218 X |

FOREIGN PATENT DOCUMENTS

| 911776 | 5/1954 | Fed. Rep. of Germany | 24/625 |
| 3212568 | 10/1983 | Fed. Rep. of Germany | 297/452 |

Primary Examiner—James T. McCall
Attorney, Agent, or Firm—Harness, Dickey & Pierce

[57] ABSTRACT

In a vehicle seat assembly which includes a support frame having a plurality of elongated apertures or slots of predetermined width provided therein and a seat cover, a trim attachment strip of extruded plastic is adapted to be sewn to the seat cover. The trim attachment strip has a base portion, a flange portion adapted to be sewn to the seat cover, and a plurality of pairs of barbed side-by-side projections extending in a spaced apart relation from the base portion. The barbed projections are inserted into slots in the support frame to secure the cover over the seat frame. The trim attachment strip is retained against removal from the support frame by the engagement of the barbs on the projections against the inner side of the support frame adjacent to the slots.

5 Claims, 2 Drawing Sheets

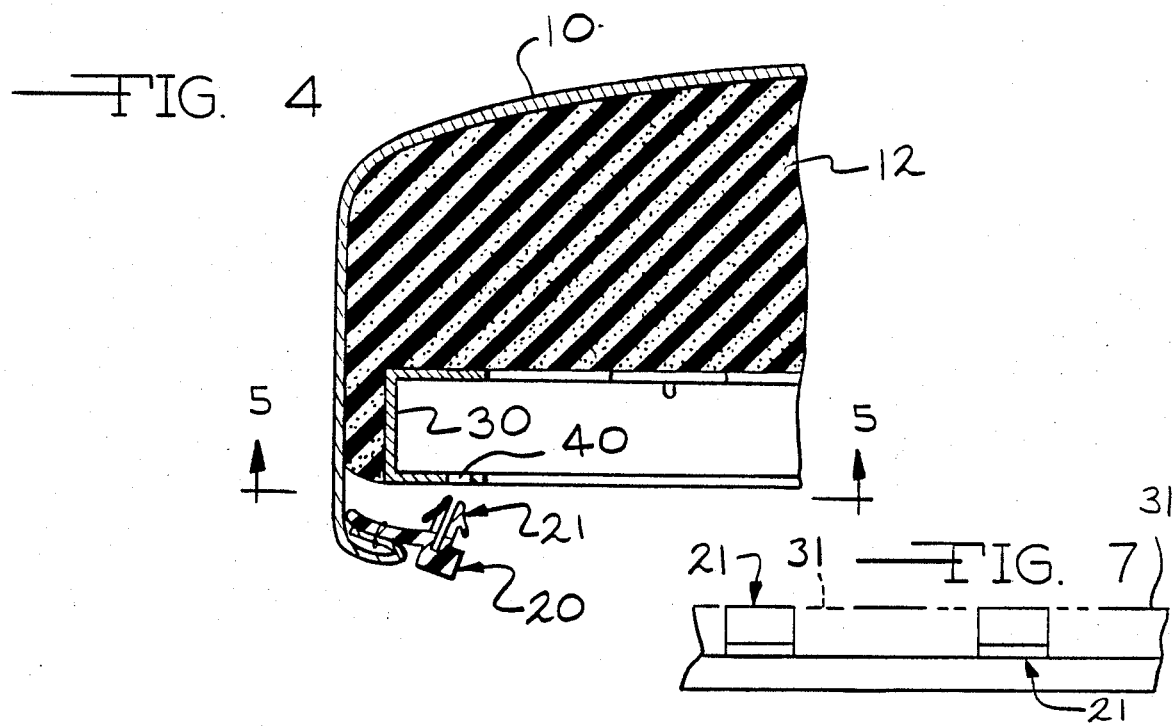
FIG. 4
FIG. 7
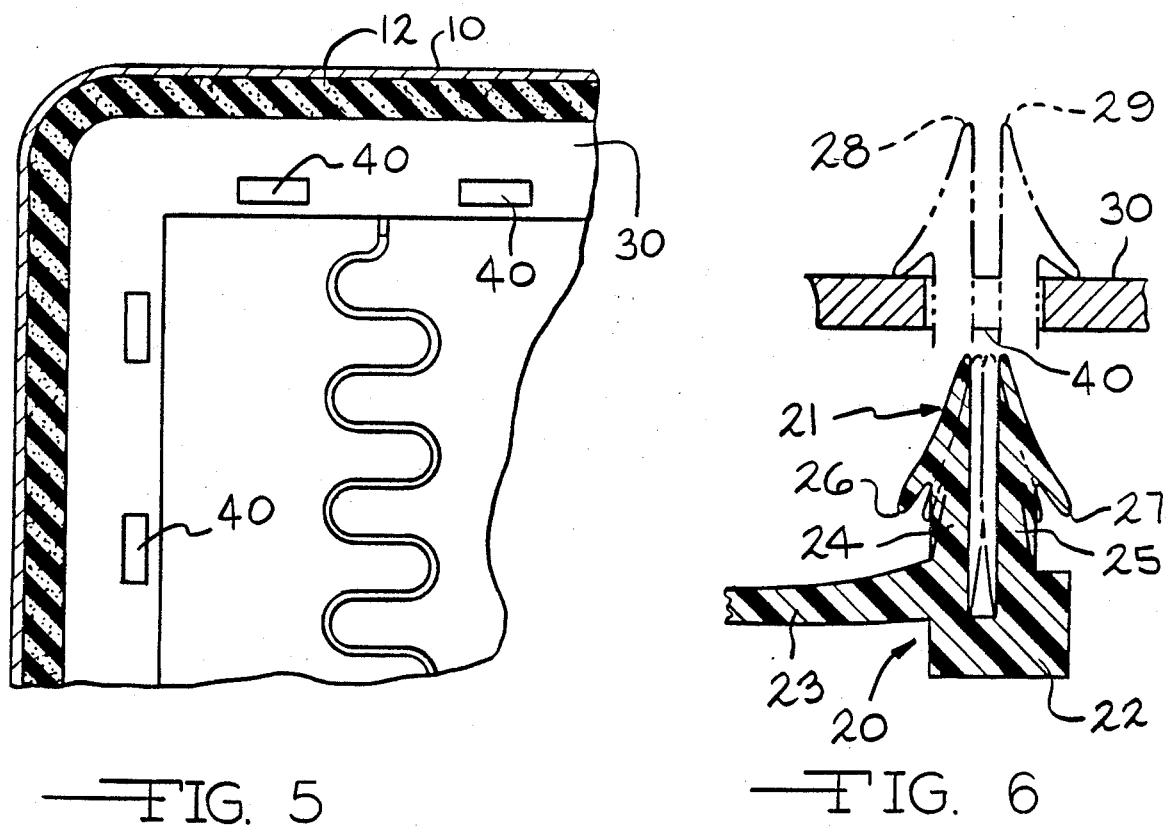
FIG. 5
FIG. 6

SEAT TRIM ATTACHMENT STRIP

BACKGROUND AND SUMMARY OF THE INVENTION

This invention relates to a seat cover fastening system for vehicle seats, and particularly for fastening a seat cover to a support frame where a covered pad or cushion is placed on top of the frame and held thereon by a trim strip which engages both the seat cover and the support frame. Examples of seat cover fastening systems in the prior art are illustrated in U.S. Pat. No. 3,981,534 and U.S. Pat. No. 4,526,420.

In U.S. Pat. No. 3,981,534, an extruded J-shaped plastic welt is adapted to be sewn to the seat cover. The vehicle seat pan has an inverted U-shaped peripheral flange. The long leg of the welt cross-section is first sewn to the seat cover. The seat cover is stretched over the seat pad and seat pan and the short leg of the welt cross-section is hooked over upwardly and inwardly projecting tabs struck out of the material of the seat pan outer peripheral flange. This design has the disadvantage that once the seat cover is installed, the welt cannot be removed.

Another seat cover fastening system, described in U.S. Pat. No. 4,526,420, involves the use of an endless fixing band made of rigid, yet elastic material such as ABS resin. The edge of the seat material is folded over and sewn, forming a tube through which the band is inserted. The seat cover is placed over the seat to which it is to be attached, and the fixing band is turned outside in, catching a downward extending perimeter of the seat frame. This design has the advantage that it is removable by flipping the band inside out. However, it has the disadvantage of requiring a continuous band hoop shape going around the seat and is therefore limited to use on a bag shape seat cover. Finally, it has the disadvantage that it is possible for the band to inadvertently flip downward and off of the frame.

It is therefore an object of the present invention to provide a seat cover fastening system providing uniform cover retention at minimal cost and minimal expenditure of labor during assembly. It is a further object of the present invention to provide a seat trim attachment strip which will lock the seat cover in place on the seat frame. It is a further object of the present invention to provide a seat trim attachment strip that allows for disengagement with the seat frame only when desired for repair or seat cover replacement.

It is yet further an object of the present invention to provide a seat trim attachment strip that is easily assembled to a seat cover and easily assembled to the seat frame.

The improved fastening system of the present invention comprises the use of a seat trim attachment strip sewn to the periphery of seat cover material. The trim attachment strip has a unitary body having a base portion and a plurality of pairs of side-by-side barbed projections, spaced apart along the base portion of the strip. The side-by-side projections are biased toward a spaced apart position, and can be flexed toward each other. Each projection terminates in a barb shaped tab which projects transversely outward from the projection. Each pair of projections is spaced to correspond to an elongated aperture or slot of predetermined width in the underside of a vehicle seat frame. The barbed tabs are dimensioned relative to the slot width and legnth such that when the projections are inserted into the slots shoulders on the barbed tabs engage the frame to prevent movement of the tabs in the projection in an opposite direction.

In operation, the flange portion of the trim attachment strip is sewn to the periphery of a properly dimensioned piece of seat cover material. The seat cover is then placed over the seat cushion which rests on the seat frame. The barbed tabs are then pushed through corresponding slots in the frame underside thus securing the cover to the frame. As the spaced apart side-by-side projections are puhsed into the slot, the projections are flexed toward each other narrowing their width thus allowing insertion through the slot. Once the retention tabs have cleared the frame, the projections snap back to a spaced apart relation and the retention tabs prevent withdrawal of the projections in the opposite direction, thus securing the seat cover to the frame.

Other objects, features and advantages of the invention will be apparent from the accompanying decsription and the appended claims when taken in connection with the accompanying drawings in which;

FIG. 4 is an enlargement of a portion of the sectional view of FIG. 3 showing the trim attachment strip in greater detail prior to tab insertion;

FIG. 5 is a sectional view taken along line 5—5 in FIG. 4 showing the bottom of the vehicle seat frame;

FIG. 6 is an enlarged view of a cross-section of the trim attachment strip on line 6—6 in FIG. 1; and FIG. 7 is a partial side view of the trim attachment strip shown in FIG. 1.

DESCRIPTION OF THE PREFERRED EMBODIMENT

Figure 1:
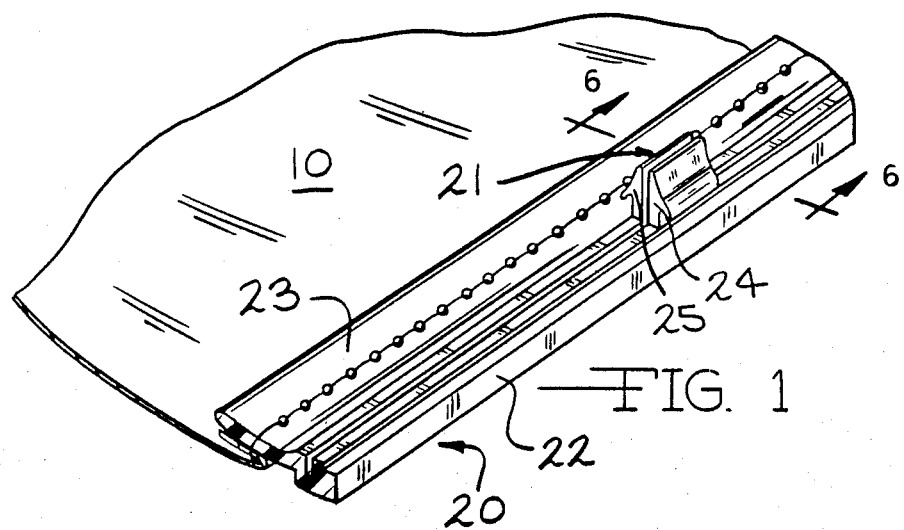
FIG. 1 is trim attachment strip according to the present invention, shown sewn to the seat cover material.

With reference to the drawings, the trim attachment strip of the present invention, indicated generally at 20, is illustrated in FIG. 1 sewn to vehicle seat cover material 10. Trim attachment strip 20 is generally comprised of tab projection 21 projecting from base portion 22 and flange portion 23. Tab projection 21 comprises projections 24 and 25 in side-by-side relation.

As best shown in FIG. 6, projections 24 and 25 extend in spaced apart relation out of base portion 22. Projections 24 and 25 terminate in tab edges 28 and 29 respectively. The outer sides of projections 24 and 25 are tapered from edges 28 and 29 outward to the edges of barb tabs 26 and 27.

Figure 2:
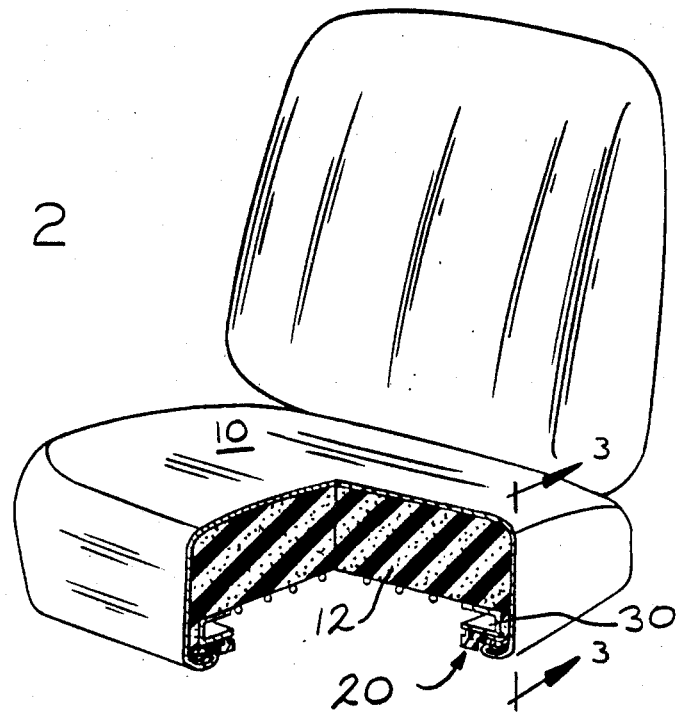
FIG. 2 is a prospective view of a vehicle seat with a portion broken away illustrating the position of the seat trim attachment strip.
Figure 3:
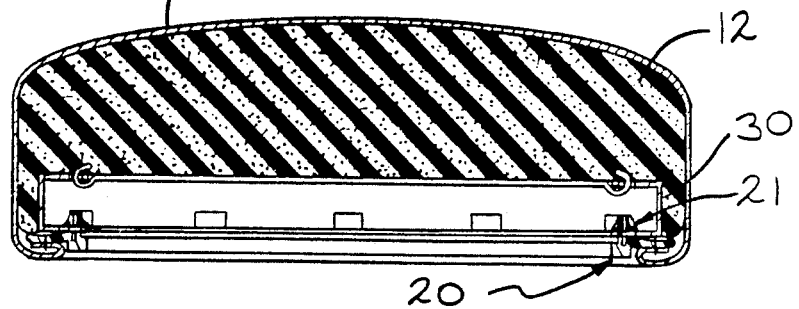
FIG. 3 is a sectional view taken on line 3—3 in FIG. 2.

FIGS. 2 and 3 illustrate the general arrangement of assembled vehicle seat components including seat frame 30, seat pad 12, seat cover 10, and trim attachment strip 20. Seat trim attachment strip 20 is sewn to the edge of seat cover material 10 and cover material 10 is then wrapped over pad 12. Trim attachment strip 20 is then in position for insertion for attachment to frame 30 as shown in the enlarged partial sectional view of a seat assembly in FIG. 4. Tab projection 21 on the trim attachment strip 20 is inserted within slot 40 in frame 30. The position of slots 40 in seat frame 30 is generally shown in the partial view of FIG. 5.

As best shown in FIG. 6, tab projection 21 is inserted within slot 40 by pressing projecting edges 28 and 29 of tab projections 21 into slot 40 in frame 30. Force applied in the direction of insertion causes projections 24 and 25 to be forced together to an engaged position shown by the lower set of broken lines in FIG. 6 allowing the barbed tabs 26 and 27 to pass through the opening 40. Once barbed tabs 26 and 27 have passed through the opening of slot 40, projections 24 and 25 snap back to their spaced apart position as shown by the upper set of broken lines in FIG. 6. Movement of projections 24 and 25 in the opposite direction is prevented by shoulders of barbed tabs 26 and 27, thus positively engaging the trim attachment strip 20 to the seat frame 30 and firmly attaching the seat cover 10.

Removal of the seat cover is facilitated by squeezing projections 24 and 25 together by squeezing barbed tabs 26 and 27 and then withdrawing the tab projection 21 through slot 40 in seat frame 30. Removal requires the use of an appropriate tool. Accordingly, inadvertent removal is thus precluded.

The length of slots 40 is not critical to the engagement of tab projection 21. Slots 40 may be varied in length but must be at least slightly longer than the tab projection 21 to allow for tab projection insertion. Lateral movement of the seat trim attachment strip 20 is permitted and does not affect the operation of the strip. Variation in slot length is advantageous because more economical fabrication methods may be employed and assembly time reduced.

The seat trim attachment strip according to the present invention may be fabricated by extruding plastic material into a continuous body 22 having integral flange 23 and a continuous pair of projecting tabs, and then removing unnecessary projection material 31 to form a plurality of tab projections 21 as shown in FIG. 7 for engagement with a corresponding number of slots 40 in the seat frame 30. Thus the present invention is easily adapted to different seat frame configurations and slot sizes.

What is claimed is:

1. In a vehicle seat assembly which includes a support frame having a plurality of spaced apart apertures of predetermined width provided therein, a seat cover member, and a trim attachment strip fastened to said seat cover member, said strip comprising:

a unitary body having an elongated base portion secured to said seat cover member and a plurality of pairs of side-by-side projections spaced apart lengthwise of said strip, each of said pairs of side-by-side projections extending in a spaced apart relation from said base portion and terminating in retention tabs which extend away from each other in a direction transversely of said projection;

said projections being capable of flexing movement toward each other to engaged positions and being biased towards spaced apart positions;

each of said tabs being of increasing width in a direction extending from the terminal end of said projection toward said base and terminating in retention shoulders which extends transversely of said projections; and said tabs being dimensioned relative to said aperture width such that in said engaged positions of said projections said tabs can be extended in one direction through said apertures to positions in which said shoulders, in the spaced apart positions of said projections, engage said frame to prevent movement of said tabs through said apertures in an opposite direction.

2. The trim attachment strip according to claim 1 wherein said projections have a barb shape, said barbs terminating in edges.

3. The trim attachment strip according to claim 1 wherein said pairs of said side-by-side projections spaced apart lengthwise of said strip are spaced to correspond to the distance between said spaced apart apertures in said support frame.

4. The trim attachment strip according to claim 2 wherein said body has a plurality of separate removed portions lengthwise of said body forming said plurality of pairs of projections lengthwise of said base portion.

5. The trim attachment strip according to claim 2 wherein said projections have a width dimension transverse of said projection along the length of said base portion slightly less than the length of said aperture in said support frame.

* * * * *